(12) United States Patent
Hart et al.

(10) Patent No.: US 7,571,800 B2
(45) Date of Patent: Aug. 11, 2009

(54) VIBRATING ALIGNMENT CONVEYOR

(75) Inventors: Colin Ray Hart, Ankeny, IA (US);
Loren Jon Aldrich, Van Meter, IA (US);
Joshua Warren Higgins, Des Moines, IA (US)

(73) Assignee: Stork Townsend Inc., Des Moines, IA (US)

( * ) Notice: Subject to any disclaimer, the term of this patent is extended or adjusted under 35 U.S.C. 154(b) by 43 days.

(21) Appl. No.: 11/927,992

(22) Filed: Oct. 30, 2007

(65) Prior Publication Data
US 2009/0107808 A1  Apr. 30, 2009

(51) Int. Cl.
*B65G 27/16* (2006.01)
(52) U.S. Cl. ............... 198/766; 198/752.1; 198/754
(58) Field of Classification Search ........... 198/752.1, 198/754, 766
See application file for complete search history.

(56) References Cited

U.S. PATENT DOCUMENTS

| | | | |
|---|---|---|---|
| 3,568,859 A * | 3/1971 | Truesdell | 198/411 |
| 3,738,258 A | 6/1973 | Goodale | |
| 4,054,015 A * | 10/1977 | Rowell | 53/446 |
| 4,094,123 A * | 6/1978 | Carlson | 53/436 |
| 4,104,847 A * | 8/1978 | Glandon et al. | 53/473 |
| 4,167,068 A * | 9/1979 | Tomadini | 34/164 |
| 4,183,192 A * | 1/1980 | Smaw | 53/444 |
| 4,482,046 A * | 11/1984 | Kraus | 198/771 |
| 4,831,925 A | 5/1989 | Zanetti | |
| 4,965,984 A * | 10/1990 | Farnsworth et al. | 53/444 |
| 6,116,409 A * | 9/2000 | Yokajty et al. | 198/771 |
| 6,655,523 B2 | 12/2003 | Jones et al. | |
| 7,086,522 B2 * | 8/2006 | Schmidt | 198/758 |

\* cited by examiner

Primary Examiner—Douglas A Hess

(57) ABSTRACT

A conveyor having a frame that includes a vibrating frame member connected to a pivot point at one end and a drive member at the opposite end. A conveyor belt is supported by the vibrating frame member and as the drive member vibrates the frame member, the belt is vibrated to cause alignment of food product against a reference edge.

15 Claims, 4 Drawing Sheets

VIBRATING ALIGNMENT CONVEYOR

BACKGROUND OF THE INVENTION

This invention is directed toward a vibrating conveyor for aligning food product, and more specifically, a vibrating conveyor that will convey and align food product through vibration at the same time.

Food product, such as sausage links and the like, need to be aligned axially on a flighted conveyor for packaging. To mechanically push a sausage on one end is difficult and must be timed to correspond with each individual flight on the conveyor belt. Also, a mechanical pusher would require adjustment to handle varying lengths of product. Other devices, such as U.S. Pat. No. 4,831,925 by Zanetti and U.S. Pat. No. 3,738,258 by Goodale have used separate containers that travel along an uneven track to align food product. Not only are these devices complex, with many moving parts, but they also are not capable of use with a conventional flighted belt. Therefore, there exists a need in the art for a conveyor that addresses these needs.

An objective of the present invention is to provide a conveyor that will convey and vibrate food product simultaneously.

Another objective of the present invention is to provide a vibrating conveyor having fewer moving parts.

A still further objective of the present invention is to provide a vibrating conveyor that utilizes a conventional flighted belt.

These and other objectives will be apparent to one of ordinary skill in the art based upon the following written description, drawings and claims.

SUMMARY OF THE INVENTION

A conveyor for aligning food product includes a frame having a vibrating frame member that moves about a pivot point. Connected to the vibrating frame member, opposite the pivot point is a drive member. Supported by the vibrating frame member is a conveyor belt. The drive member moves/vibrates the vibrating frame member as the belt traverses thereover, which in turn vibrates the belt and aligns the food product.

DETAILED DESCRIPTION OF THE PREFERRED EMBODIMENTS

Figure 1:
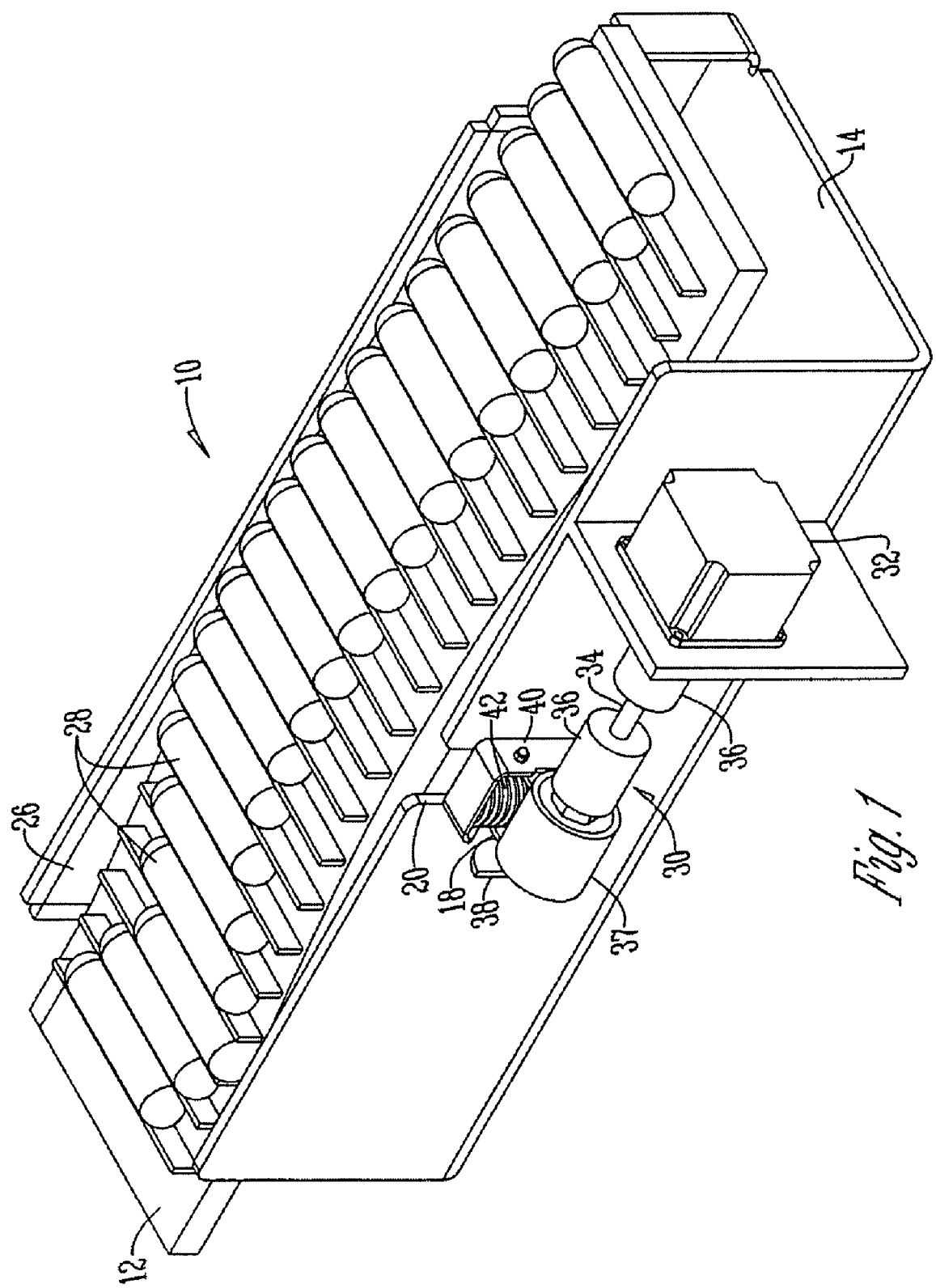
FIG. 1 is a perspective view of a conveyor.
Figure 2:
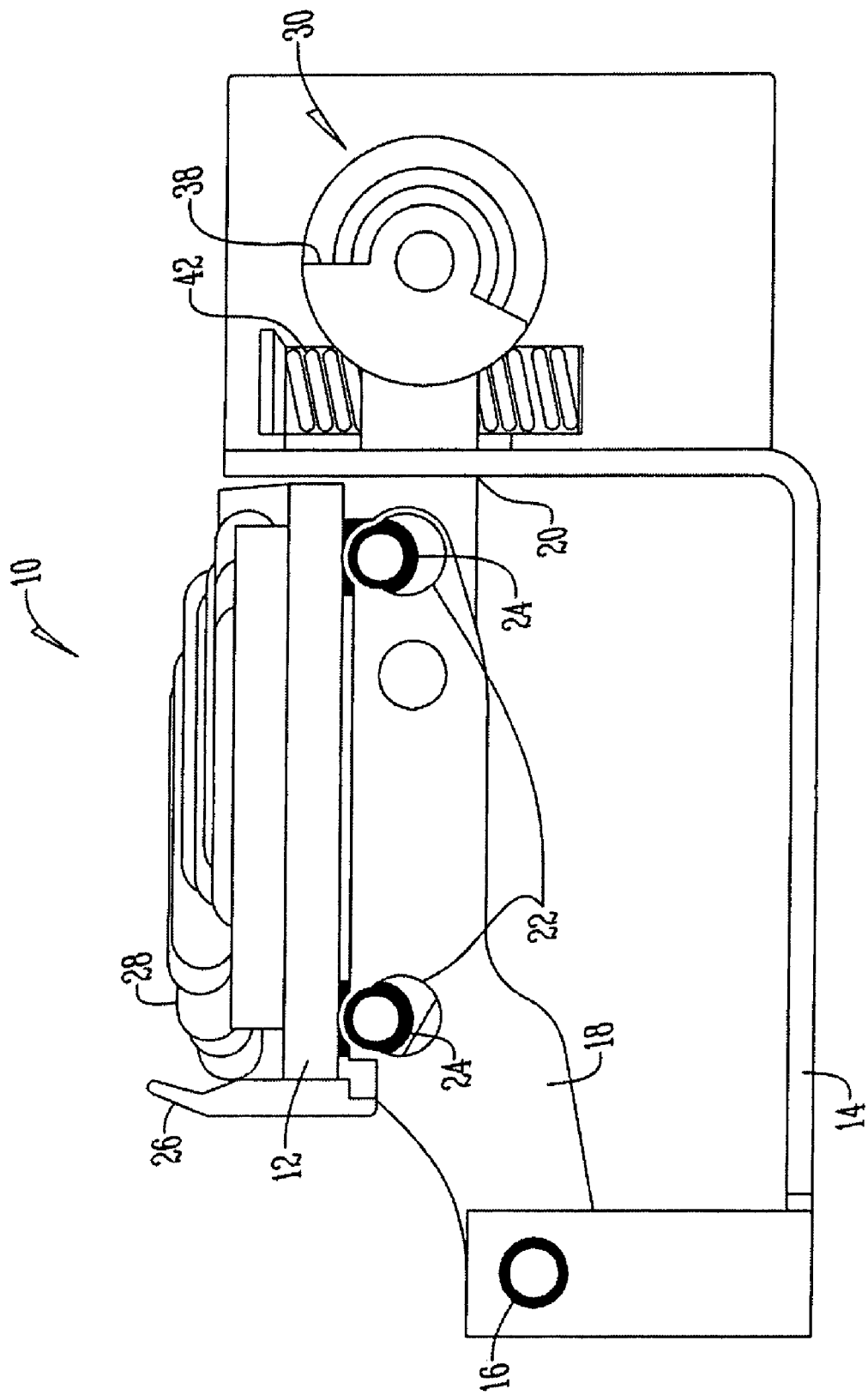
FIG. 2 is an end view of a conveyor.
Figure 3:
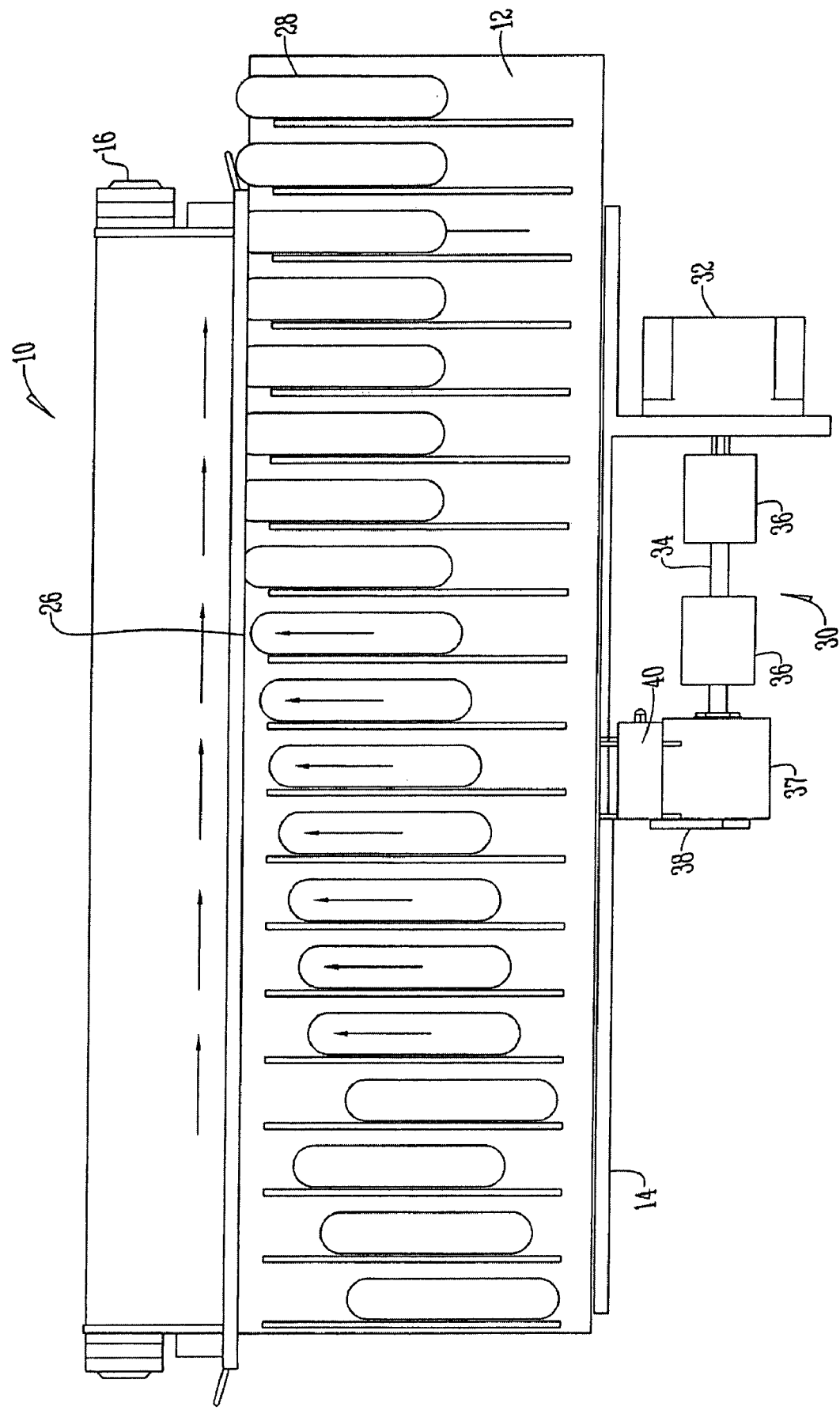
FIG. 3 is a top plan view of a conveyor.
Figure 4:
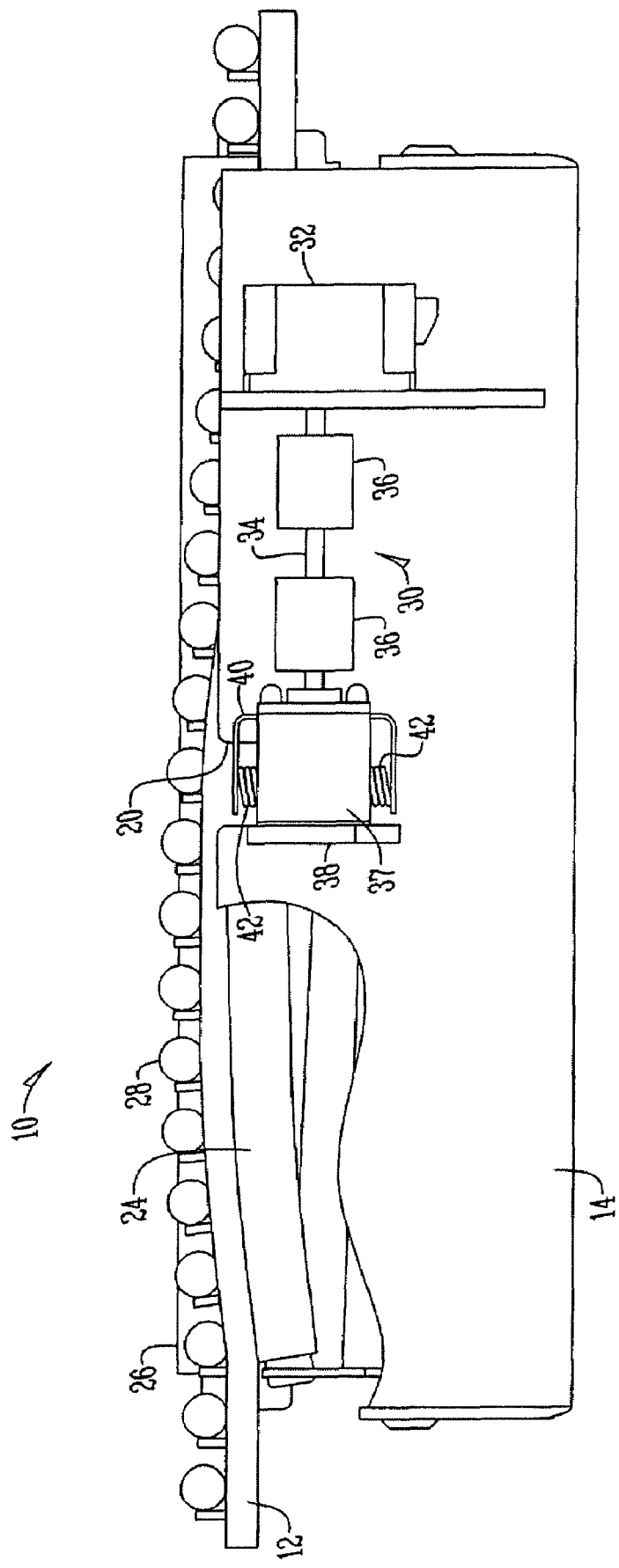
FIG. 4 is a side view of a conveyor.

The conveyor 10 includes a conventional flighted conveyor belt 12 supported by a vibrating frame member 18. Pivotally connected at a pivot point 16 is a support frame member 14. The vibrating frame member 18 extends from the pivot point 16, across the support frame member 14 and through a slot 20 on the opposite side of the support frame member 14.

The vibrating frame member 18 has at least a pair of openings 22 that receive a pair of bowed guide members 24 that support the flighted conveyor belt 12. Openings 22 are used for removal of bowed guide members 24. Connected to the vibrating frame member 18, adjacent the pivot point 16 is a reference edge 26. The reference edge 26 provides a stop to aid in aligning food product 28. Specifically, the reference edge 26 can be stationary, vibrating or traveling with the conveyor belt 12.

Movement of the vibrating frame member 18 is initiated and controlled by a drive member 30. The drive member includes a drive motor 32 having a drive shaft 34 extending therefrom. Connected to the drive shaft 34 are a pair of flexible couplings 36. The drive shaft 34 extends through a cylindrical housing 37 that is connected to the end of the vibrating frame member 18. Connected to the end of the drive shaft are preferably two counter weights 38. The position of the counter weights 38 in relation to one another are adjusted to affect vibration as the drive shaft rotates.

Mounted to the support frame member 14, adjacent slot 20 is a C-shaped bracket 40. Mounted within the bracket 40 are a pair of springs 42 positioned to engage both the vibrating frame member 18 and bracket 40.

In operation, food product 28 is deposited on the flighted belt 12 for transport to a packaging station (not shown). As the product reaches a vibration zone the product is aligned against the reference edge 26. Alignment occurs as a result of vibration of the product 28 while being transported along the flighted conveyor belt. Vibration is created through a combination of the drive member 30, the vibrating frame member 18, and the bowed guide members 24. A controller (not shown) activates the drive motor 32 that in turn rotates the drive shaft 34. As the drive shaft 34 rotates, the counter weights 38 cause the drive shaft 34 to move up and down engaging housing 37. The engagement of drive shaft 34 with housing 37 causes the vibrating frame member 18 to pivot about pivot point 16. As the vibrating frame member 18 pivots it engages conveyor belt 12 lifting a portion of the belt 12 supported by the bowed guide members 24. As a result only this portion of the conveyor belt vibrates to align the food product.

When belt 12 is lifted by the vibrating action, the tension in the belt 12 will cause the belt 12 to fall faster than gravity. As the belt 12 falls faster than gravity, separation between the belt 12 and the food product 28 occurs. With the vibrating action of the vibrating frame member 18 about pivot point 16 being an upward/sideways movement, the food product 28 moves axially on the conveyor and transverse to the direction of flow of the conveyor belt 12.

One skilled in the art would appreciate that other techniques, such as the use of a hold down device that would keep the belt 12 in contact with the vibrating frame member 18 could be used. Also, it should be understood that the conveyor 10 could be used with a product 28 of any shape, with or without flights.

Thus, a conveyor has been shown where the direction and rate of vibration causes product to move laterally, rather than the slope of conveyance. Further a conveyor has been shown, that at the very least, meets all of the stated objectives.

What is claimed is:

1. A conveyor for aligning food product comprising:
   a frame having a vibrating frame member;
   a conveyor belt supported by the frame; and
   a drive member directly connected to the vibrating frame member causing the vibrating frame member to vibrate about a pivot point and in turn cause the conveyor belt to vibrate.

2. The conveyor of claim 1 further comprising a reference edge connected to the frame.

3. The conveyor of claim 1 wherein the vibrating frame member has openings that receive guide members.

4. The conveyor of claim 3 wherein the guide members are bowed.

5. The conveyor of claim 1 wherein the drive member comprises a drive motor, a drive shaft operatively connected to the motor at one end, and two counter weights mounted to the opposite end of the drive shaft.

6. The conveyor of claim 1 further comprising a bracket mounted to the frame and positioned such that two springs engage the bracket and the vibrating frame member.

7. The conveyor of claim 1 wherein the conveyor belt is supported by the vibrating frame member.

8. The conveyor of claim 7 wherein vibration of the vibrating frame member repositions a conveyed product on the conveyor belt.

9. The conveyor of claim 8 wherein the vibration of the vibrating frame member causes the conveyed product to be repositioned transversely to a direction of flow of the conveyor belt.

10. The conveyor of claim 1 wherein a reference edge aligns the food product on the conveyor.

11. The conveyor of claim 1 wherein a reference edge is stationary.

12. The conveyor of claim 1 wherein a reference edge is vibrating.

13. The conveyor of claim 1 wherein a reference edge is traveling with the conveyor belt.

14. The conveyor of claim 1 wherein the guide members are received by and pass through openings in the vibrating frame member.

15. A conveyor for aligning food product comprising:
   a frame having a vibrating frame member;
   a conveyor belt supported by the frame;
   a drive member operatively connected to the vibrating frame member causing the vibrating frame member to vibrate about a pivot point and in turn cause the conveyor belt to vibrate;
   the vibrating frame member has openings that receive guide members wherein when the guide members are bowed a portion of the conveyor belt is lifted upward away from the frame creating tension in the conveyor belt such that only this portion of the conveyor belt vibrates.

* * * * *